United States Patent
Cui et al.

(10) Patent No.: US 11,455,781 B2
(45) Date of Patent: Sep. 27, 2022

(54) DATA READING/WRITING METHOD AND SYSTEM IN 3D IMAGE PROCESSING, STORAGE MEDIUM AND TERMINAL

(71) Applicants: VeriSilicon Microelectronics (Shanghai) Co., Ltd., Shanghai (CN); VeriSilicon Holdings Co., Ltd., Cayman Islands (GB); VeriSilicon Microelectronics (Nanjing) Co., Ltd., Nanjing (CN)

(72) Inventors: Zhonghao Cui, Shanghai (CN); Mankit Lo, San Jose, CA (US); Ke Zhang, Shanghai (CN); Huiming Zhang, Shanghai (CN)

(73) Assignees: VeriSilicon Microelectronics (Shanghai) Co., Ltd., Shanghai (CN); VeriSilicon Holdings Co., Ltd., Grand Cayman (KY); VeriSilicon Microelectronics (Nanjing) Co., Ltd., Nanjing (CN)

( * ) Notice: Subject to any disclaimer, the term of this patent is extended or adjusted under 35 U.S.C. 154(b) by 0 days.

(21) Appl. No.: 17/257,859

(22) PCT Filed: Sep. 25, 2019

(86) PCT No.: PCT/CN2019/107678
§ 371 (c)(1),
(2) Date: Jan. 5, 2021

(87) PCT Pub. No.: WO2020/073801
PCT Pub. Date: Apr. 16, 2020

(65) Prior Publication Data
US 2021/0295607 A1  Sep. 23, 2021

(30) Foreign Application Priority Data
Oct. 10, 2018 (CN) .......................... 201811179323.6

(51) Int. Cl.
*G06T 19/20* (2011.01)
*G06N 3/08* (2006.01)
(Continued)

(52) U.S. Cl.
CPC ............... *G06T 19/20* (2013.01); *G06N 3/08* (2013.01); *G06T 3/4038* (2013.01); *G06N 3/04* (2013.01);
(Continued)

(58) Field of Classification Search
CPC ......... G06T 19/20; G06T 3/4038; G06T 1/60; G06T 2207/20084; G06N 3/08; G06N 3/063; G06N 3/0454; G06N 3/04
See application file for complete search history.

(56) References Cited

U.S. PATENT DOCUMENTS

| 2015/0228106 A1 | 8/2015 | Laksono |
| 2016/0119575 A1* | 4/2016 | Dabral ............... H04N 5/23232 348/362 |

(Continued)

FOREIGN PATENT DOCUMENTS

| CN | 101859280 A | 10/2010 |
| CN | 108475347 A | 8/2018 |
| CN | 108629734 A | 10/2018 |

OTHER PUBLICATIONS

Martins, L."Accelerating Curvature Estimate in 3D Seismic Data Using GPGPU"2014 1EEE 26th International Symposium on Computer Architecture and High Performance Computing,Nov. 30, 2014(Nov. 30, 2014), ISSN:1550-6533,abstract, and part I, last paragraph, part II, last three paragraphs and parts IV-VI.

*Primary Examiner* — YuJang Tswei

(57) ABSTRACT

The present disclosure provides a data reading/writing method and system for in 3D image processing, a storage medium and a terminal. The method includes the following steps: dividing a 3D image horizontally based on the vertical
(Continued)

sliding technology, the 3D image is divided into at least two subimages, a processing data of each subimage is stored in a circular buffer, after the subimage is processed, an overlapping portion data required by next subimage is retained in the circular buffer; dividing a multi-layer network of an image processing algorithm into at least two segments, the data between adjacent layers in each segment only interact through buffer, not through DDR.

5 Claims, 4 Drawing Sheets

(51) Int. Cl.
  *G06T 3/40* (2006.01)
  *G06N 3/063* (2006.01)
  *G06N 3/04* (2006.01)
  *G06T 1/60* (2006.01)
(52) U.S. Cl.
  CPC ........... *G06N 3/0454* (2013.01); *G06N 3/063* (2013.01); *G06T 1/60* (2013.01); *G06T 2207/20084* (2013.01)

(56) References Cited

U.S. PATENT DOCUMENTS

| | | | |
|---|---|---|---|
| 2018/0307976 A1* | 10/2018 | Fang | G06N 3/08 |
| 2018/0322606 A1* | 11/2018 | Das | G06T 1/20 |
| 2019/0057060 A1* | 2/2019 | Nicol | G06N 3/08 |

* cited by examiner

| dividing a 3D image horizontally based on the vertical sliding technology, the 3D image is divided into at least two sub-images, a processing data of each sub-image is stored in a circular buffer, after the sub-image is processed, an overlapping portion data required by next sub-image is retained in the circular buffer | S1 |

↓

| dividing a multi-layer network of an image processing algorithm into at least two segments, the data between adjacent layers in each segment only interact through buffer, not through DDR | S2 |

FIG. 1

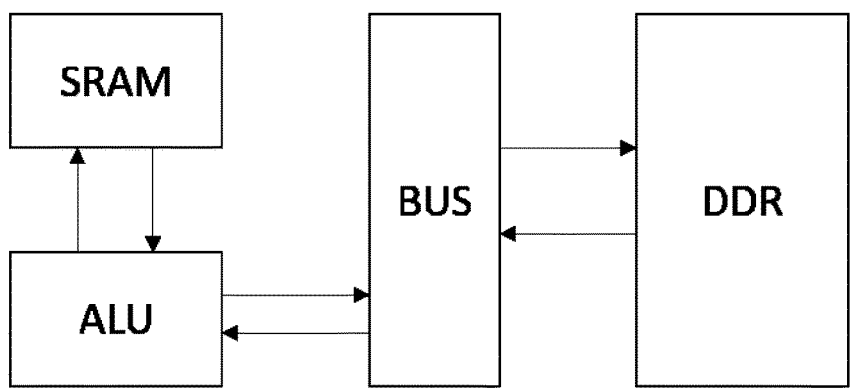

FIG. 2

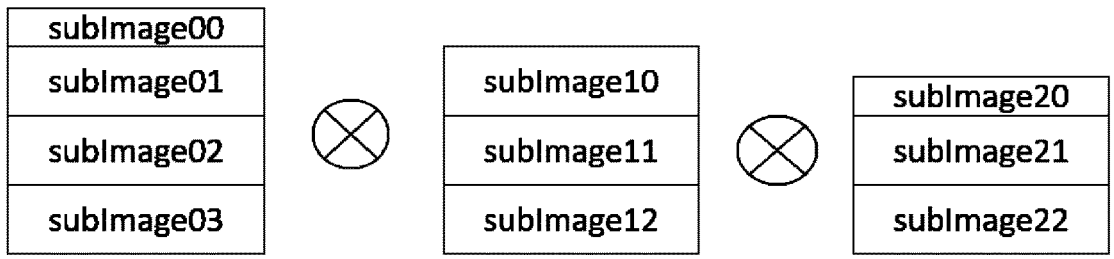
FIG. 4
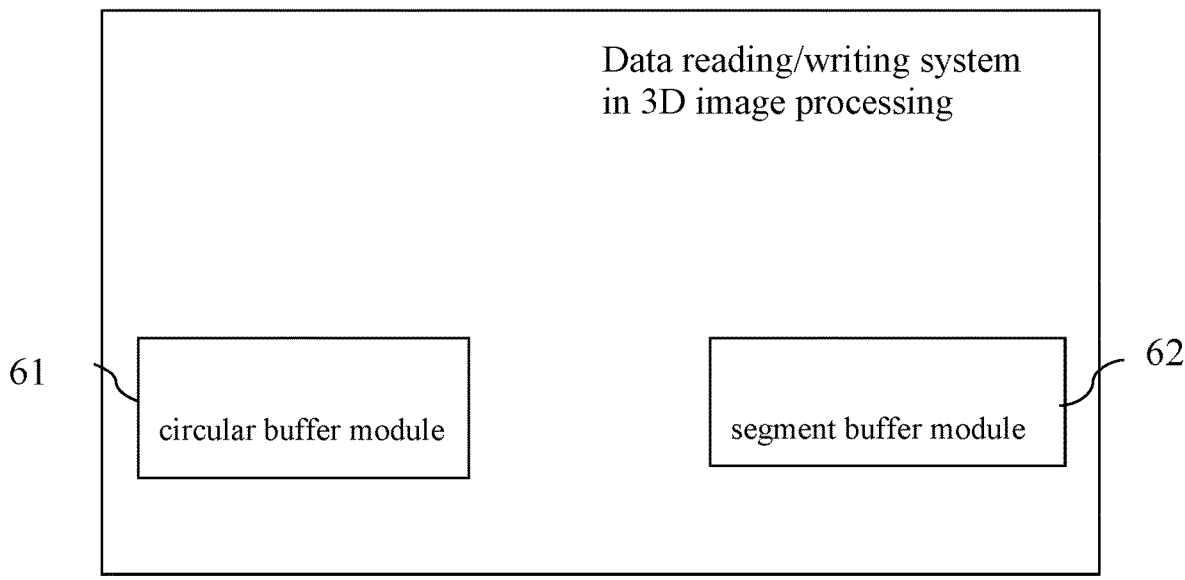
FIG. 5
FIG. 6

DATA READING/WRITING METHOD AND SYSTEM IN 3D IMAGE PROCESSING, STORAGE MEDIUM AND TERMINAL

CROSS REFERENCES TO RELATED APPLICATIONS

This is a Sect. 371 National Stage of a PCT International Application No. PCT/CN2019/107678, filed on Sep. 8, 2010, which claims priority to a Chinese Patent Application No. 2018111793236, filed on Oct. 10, 2018, the contents of which are hereby incorporated by reference in its entirety, including any appendices or attachments thereof, for all purposes.

TECHNICAL FIELD

The present disclosure relates to the technical field of buffer applications, and in particular, to a data reading/writing method and system in 3d image processing, storage medium and terminal.

BACKGROUND

Digital image processing is a method and technique for removing noise, enhancement, restoring, segmentation, feature extraction and the like of images by computer. The 3D image processing algorithm often divides images into multiple layers and processes layer by layer. Each layer has an input image and an output image. Therefore, in the specific implementation process of 3D image processing, huge memory bandwidth is required. For example, in the neural network Alex net, 724M MACs calculated quantity requires 3000M data access. When all the storages are achieved by off-chip DRAMs, the huge bandwidth brings high power consumption and high latency, which seriously affects system performance. Therefore, reading and writing data becomes the bottleneck of 3D image processing.

In the prior art, multiple levels of local storage are added between the double date rate (DDR) and arithmetic logic unit (ALU) to reuse contents in the buffer as much as possible is an effective way to reduce DDR bandwidth. For example, the global buffer between DRAM and ALU, the local shared storage that can be accessed by each other is added between each ALU, and the register file is added inside the ALU. At the same time, the hardware is often more complicated and the area increases.

In addition, the bandwidth is reduced by reducing the bit width of the data. Specifically, by quantifying the data represented by low bit digit, the amount of data to be processed is reduced, and then the output results are counter-quantified. As the data bit width is reduced, the calculation accuracy is reduced. For neural networks, the data needs to be retrained.

The image processing algorithm processes the image in a certain order. As a result, the buffer can be used reasonably according to the analysis and control of data flow. The image is divided into smaller tile, and be processed in turn. This method reduces the memory read span. The unit of the buffer is tile, and the buffer unit becomes smaller, therefore smaller memory management units (MMU) or buffer units can be used. However, there is overlapping data between adjacent tiles. When a point at the tile boundary needs to be processed, the data of adjacent tiles needs to be repeatedly accessed. The data that needs to be processed together between tiles is called overlap data. If a tile is buffered, the overlap data is also need to be buffered. The next layer cannot be operated before a first layer is buffered. The results between the layers will need a huge bandwidth if stored in the DDR, and will need a huge buffer area if stored in the buffer. Therefore, how to provide buffer utilization is an important research direction.

SUMMARY

The present disclosure provides a data reading/writing method and system in 3d image processing, storage medium and terminal. Based on 3D vertical sliding technology and circular buffer, the present disclosure greatly improves the buffer utilization rate in 3D image processing, reduces processing for overlap data under limited buffer conditions, thereby alleviating bandwidth consumption and reading/writing latency in image processing.

The present disclosure provides a data reading/writing method in 3d image processing. The method includes the following steps: dividing a 3D image horizontally based on the vertical sliding technology, wherein the 3D image is divided into at least two subimages, a processing data of each subimage is stored in a circular buffer, after the subimage is processed, an overlapping portion data required by next subimage is retained in the circular buffer; dividing a multi-layer network of an image processing algorithm into at least two segments, the data between adjacent layers in each segment only interact through buffer, not through DDR.

In one embodiment of the present disclosure, the size of the circular buffer occupied by each subimage is SubimageXsize*(SubimageYsize+OverlapSize)*SubimageZSize, subimageXsize, subimageYsize, subimageZSize, and OverlapSize a size in X direction, Y direction, Z direction, and overlapping size.

In one embodiment of the present disclosure, in each segment, the output data of each layer is written into the buffer except the last layer, each layer except the first layer reads data from the buffer.

In one embodiment of the present disclosure, the method is applied to 3D image processing of a neural network.

The present disclosure further provides a data reading/writing system in 3D image processing. The system includes a circular buffer module and a segment buffer module; the circular buffer module divides a 3D image in a horizontal direction based on vertical sliding technology into two subimages; the processing data of the subimage is stored in a circular buffer; after the subimage is processed, an overlapping portion data required by next subimage is retained in the circular buffer; the segment buffer module divides a multi-layer network of an image processing algorithm into at least two segments, the data between adjacent layers in each segment only interact through buffer, not through DDR.

In one embodiment of the present disclosure, the size of the circular buffer occupied by each subimage is SubimageXsize*(SubimageYsize+OverlapSize)*SubimageZSize, subimageXsize, subimageYsize, subimageZSize, and OverlapSize a size in X direction, Y direction, Z direction, and overlapping size.

In one embodiment of the present disclosure, in each segment, the output data of each layer is written into the buffer except the last layer, each layer except the first layer reads data from the buffer.

In one embodiment of the present disclosure, the system is applied to 3D image processing of a neural network.

The present disclosure further provides a storage medium, containing a computer program, when executed by a processor, the computer program causes the processor to perform above data reading/writing method in 3D image processing.

The present disclosure further provides a terminal, including: a processor and a memory; the memory stores a computer program; the processor executes the computer program stored in the memory, the terminal executes above data reading/writing method in 3D image processing.

As mentioned above, the data reading/writing method and system in 3D image processing, storage medium, and terminal in the present disclosure have the following advantages:
(1) Based on 3D vertical sliding technology and circular buffer, the processing of overlapping parts is reduced and the buffer utilization rate in 3D image processing is greatly improved in the case of limited buffer;
(2) By analyzing the entire network, with a limited buffer, the results between layers no longer have to use DDR interaction, thereby reducing access to DDR, reducing the bandwidth requirements of image processing algorithm, reducing the latency and power consumption of data reading/writing;
(3) A smaller buffer area is required in the design of hardware.

BRIEF DESCRIPTION OF THE DRAWINGS

FIG. 1 is a flowchart of the data reading/writing method in 3D image processing according to one embodiment of the present disclosure.

FIG. 2 is a schematic diagram of the data structure of the image processing algorithm.

FIG. 3 (b) is a schematic diagram of a vertical slide of a 3D image as a subimage in another embodiment.

FIG. 4 is a schematic diagram of a correspondence relationship between subimages in one embodiment.

FIG. 5 is a schematic diagram of a circular buffer of a 3D image in one embodiment.

FIG. 6 is a schematic diagram of a data reading/writing system in a 3D image processing system according to one embodiment of the present disclosure.

Figure 3A:
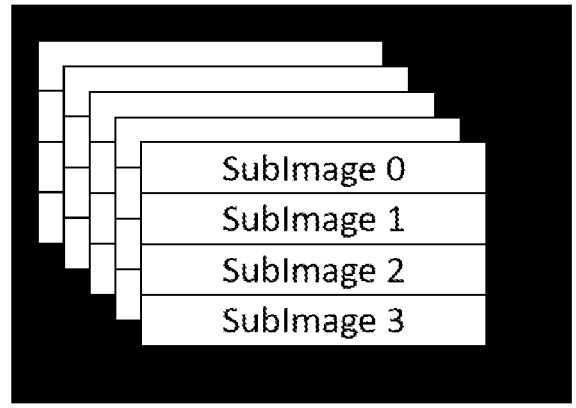
FIG. 3 (a) is a schematic diagram of vertical sliding of a 3D image as a subimage in one embodiment.

COMPONENT REFERENCE NUMERALS 61 circular buffer module
62 segmented buffer module
71 processor
72 memory

DETAILED DESCRIPTION OF THE PREFERRED EMBODIMENTS

The following specific examples illustrate the implementation of the disclosure, the person skilled in this field can easily understand the other advantages and effects of the disclosure by the contents disclosed in this specification. The present disclosure can also be implemented or applied through other different concrete implementation methods, and the details in this specification can also be modified or changed without deviating from the spirit of the disclosure based on different views and applications. It should be noted that, without conflict, the following embodiments and the features in the embodiments can be combined.

It should be noted that the diagrams provided in the following embodiments illustrate the basic concept of the disclosure only in a schematic manner, and that the schemata only show the components related to the disclosure rather than drawing according to the number, shape and size of the components at the time of actual implementation, the type, quantity and proportion of each component at the time of actual implementation can be changed at will, and the layout of the components may be more complicated.

The data reading/writing method and system in the 3D image processing, storage medium and terminal of the present disclosure are based on the 3D vertical sliding technology and circular buffer, which greatly improves the buffer utilization rate in 3D image processing with the limited buffer, and reduces the overlap partial processing and access to DDR, thereby reducing the bandwidth consumption and reading and writing latency in image processing, greatly improving the speed of 3D image processing.

As shown in FIG. 1, in one embodiment, the method for data reading/writing in 3D image processing of the present disclosure includes the following steps:

Step S1: dividing the 3D image horizontally based on the vertical sliding into at least two subimages; for each subimage, storing the processing data of the subimage to a circular buffer; after processing the subimage, the overlapping data required by the next subimage is retained in the circular buffer.

Figure 3B:
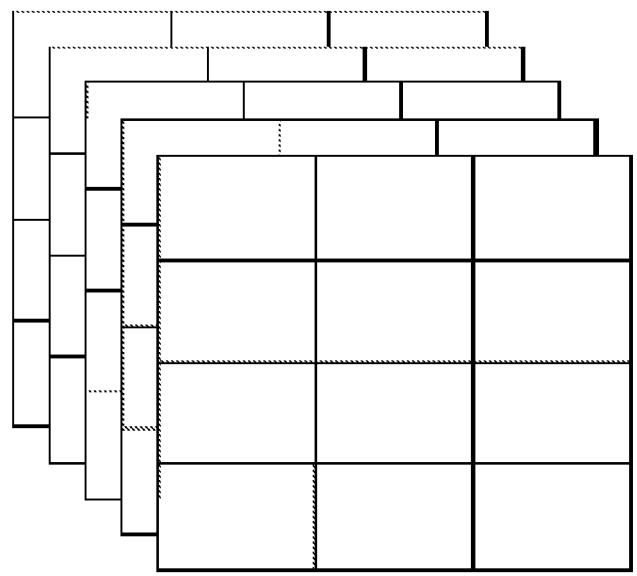

Specifically, when dividing a 3D image, it slides from top to bottom in the vertical direction according to a certain 3D square size in sequence, this technology is known as vertical sliding technology. Vertical sliding technology divides the original 3D image into multi-layers, and each layer contains no overlapping data. The size of the 3D sliding block is fixed during the division process. The first layer or the last layer is adjusted according to the actual size of the 3D image and the size of the 3D sliding block. As shown in FIG. 3 (a), the 3D image is divided into 4 subimages, which are recorded as subimage0, subimage1, subimage2, and subimage3, respectively.

As shown in FIG. 2, the ALU accesses the DDR through the bus and can directly access the SRAM buffer. The first request requests data from DDR, and the required buffer data is buffered into SRAM. When ALU requests data again, if the data is in the buffer in SRAM, it can be read directly from buffer SRAM.

In the present disclosure, a 3D image is divided horizontally, and each divided block is called a subimage. Preferably, each subimage is prolate. Assuming that each subimage has a width the same as the original image, the height of the largest sub image can be calculated based on the size of the available SRAM. FIG. 3 (a) is a typical division. The depth of the subimage in the X and Z directions is the same as the original image, but the height in the Y direction is reduced. If the value of the calculated subimage is negative or 0, the 3D image needs to be separated left and right. FIG. 3 (b) shows a left and right partition, which divides the original 3D image into 3×4 3D subimages.

Specifically, the present disclosure introduces a circular buffer during the processing of the subimage. After processing a subimage, the subimage below the processed subimage is processed without temporarily destroying the buffer of the previous subimage overlap row, so as to reduce the reading of overlapping data from the DDR. During each execution, the overwritten data in the circular buffer is the data which has been consumed in the previous subimage and will not be used again. This operation can save space, and reduce repeated reading and writing of the overlap. During the image convolution operations, the size of the overlap is related to the height of the convolution kernel. The subimages in the vertical division direction share a circular buffer; the subimages adjacent in the horizontal direction need to process the overlap utilization data.

Specifically, if the height of each sliding window is N and the height of the convolution kernel is M, the first row of the second layer needs to reuse the M−1 row of the first layer. In the circular buffer, after the first layer is processed, the second layer below the first layer is processed, the second layer starts from the end of the first layer and returns to the head of circular buffer when encountering the tail of the circular buffer. The overlapped part of the first layer is last few rows of the first layer which are required by the first row of the second layer, thereby saving the buffer and increasing the buffer utilization rate.

During the subimage division, there is a corresponding relationship between the subimages of different layers. As shown in FIG. 4, three subimages in two layers are divided. It should be noted that for simplicity, the Z-direction is not shown herein. Assuming the height of Subimage00 and Subimage20 is 2, and the height of other subimages is 4. When performing the convolution operation, the two convolution kernels are 3×3, then Subimage00 and Subimage10 correspond to the input of Subimage10, Subimage10 is the input of Subimage20, and other dependencies are deduced by analogy. Specifically, when Subimage11 is used as input, the content of subimage10 is required, the required rows of subimage10 are the rows which are overlapped. By using circular buffer technology, only the overlapping rows and newly generated results need to be stored in SRAM, the entire original 3D image output no longer needs to be stored.

The circular buffer is achieved by using the entire 3D image as a circular unit. Each Z-plane reserves space for the overlap rows. Assume that a 3D image has two planes in the Z direction, which are marked as Z0 and Z1. There are 8 rows in the Y direction, marked as R0 to R7. The 3D image is divided into two subimages, called subimage0 and subimage1. Subimage0 contains R0 to R3, and subimage1 contains R4 to R7. Assuming the size of the convolution kernel is 3×3×2, and the overlap between the sub images is two rows. The size of the circular buffer is SubimageXsize* (SubimageYsize+OverlapSize)*SubimageZSize. SubimageXsize, SubimageYsize, SubimageZSize, and OverlapSize are the size of the subimage in X direction, Y direction, Z direction, and the overlapping size, respectively.

As shown in FIG. 5, when subimage0 is buffered, the overlap space is reserved in the circular buffer. In one embodiment, the reserved overlap space includes two rows, which are shown as "empty". Subimage0 is buffered and consumed by the network of the next layer. When subimage1 is buffered next time, each Z-plane of subimage1 will start from the empty corresponding to each Z-plane of subimage0, or be stored sequentially from the last position of the corresponding Z-plane. The buffer is stored in sequence, and the overlapped part is exactly the part that Subimage0 has been consumed. When a Z face encounters a circular tail, head part of the buffer will be overwritten. The uncovered rows of each Z face are just the rows required for the overlap.

It should to be noted that the divided heights of multiple subimages of a same 3D image are not necessarily the same. It is required to know the starting address, width, height, stride, and output address information of the 3D subimage when processing one subimage. After dividing the subimage, these parameters are required to be configured correctly.

Step S2: dividing the multi-layer network of the image processing algorithm into at least two segments, so that the data between adjacent layers in each segment only interacts through the buffer, not through the DDR.

Specifically, the image processing model often includes multiple layers, each layer completes the corresponding task, and there are data dependencies between adjacent layers. Therefore, if the data interaction between two adjacent layers is completed by DDR, a large DDR bandwidth and delay will be caused. If the intermediate results are buffered in the Buffer, a huge buffer will be occupied. After being divided into subimages, the intermediate results between layers use the subimage as a buffer unit, and it is no longer need to buffer all the intermediate results of the entire layer. Therefore, the present disclosure determines how many layers can use the buffer to interact according to the size of the buffer. In these layers, the first layer reads data from DDR, buffer the outputs, and the middle layer reads from the buffer and writes to the buffer until the data of the last layer is written back to the DDR. A layer that meets the above conditions becomes a segment. That is, the result of each layer except the last layer in the segment is written into the SRAM buffer, all the layers read data from the SRAM except the first layer.

The smaller the divided subimage is, the smaller the SRAM occupied by the circular buffer is, which also means that the larger the proportion of the overlap portion in the subimage is, the lower the effective data occupation rate is. Therefore, the data buffered through DDR has cost different from the data buffered through SRAM. Different segmentation may have different performance costs and SRAM utilization rate, so it is required to find the optimal solution. Meanwhile, the division of layers is also related to the division of subimages.

Preferably, the data reading/writing method in 3D image processing of the present disclosure is applied to 3D image processing of neural network.

As shown in FIG. 6, in one embodiment, the data reading/writing system in 3D image processing of the present disclosure includes a circular buffer module 61 and segment buffer module 62.

The circular buffer module 61 divides a 3D image horizontally according to a vertical sliding technology, and the 3D image is divided into at least two subimages. For each subimage, the processing data of the subimage is stored in a circular buffer. After the subimage is processed, the overlapping partial data required by the next subimage is retained in the circular buffer.

The segment buffer module 62 is used for dividing a multi-layer network of an image processing algorithm into at least two segments, so that data between adjacent layers in each segment only interact through the buffer, not through DDR.

It should be noted that the structure and principle of the circular buffer module 61 and the segment buffer module 62 corresponds to those of the steps in the data reading/writing method in 3D image processing mentioned, so it is not repeated herein.

It should be noted that the division of each module of the above device is only a division of logical functions. Actually, it can be fully or partially integrated into one physical entity, or it can be physically separated. Furthermore, these modules can be achieved in the form of software through calling processing component, or can be achieved by hardware, or some modules can be achieved in the form of software through calling processing component, and some modules are implemented in the form of hardware. For example: x module can be configured separately, or can be integrated in one chip of the above device. In addition, the x module can be stored in the form of program code in memory of the above device, and is selected and executed by a certain processing element of the above device. The implementation of other modules is similar.

All or part of these modules can be integrated together or implemented independently. The processing element described herein may be an integrated circuit with signal processing capabilities. In the implementation process, each step mentioned above or each modules mentioned above may be completed by an integrated logic circuit of hardware in a processor element or an instruction in a software form. The above modules may be one or more integrated circuits configured to implement the above methods, for example: one or more Application Specific Integrated Circuit (ASIC), one or more microprocessors (Digital Signal Processor, DSP), one or more Field Programmable Gate Arrays (FPGA) and the like. When one of the above modules is implemented in the form of a processing component dispatcher code, the processing element may be a general-purpose processor, like a central processing unit (CPU) or other processor, to call the program code. These modules can be integrated together to form a System-on-a-chip (SOC).

A storage medium of the present disclosure includes a computer program, and when the program is executed by a processor, the data reading/writing method in 3D image processing described above is implemented.

Preferably, the storage medium includes: various storage devices such as a ROM, a RAM, a magnetic disk, a U-disk, a memory card, or a compact disc and other storage medium.

Figure 7:
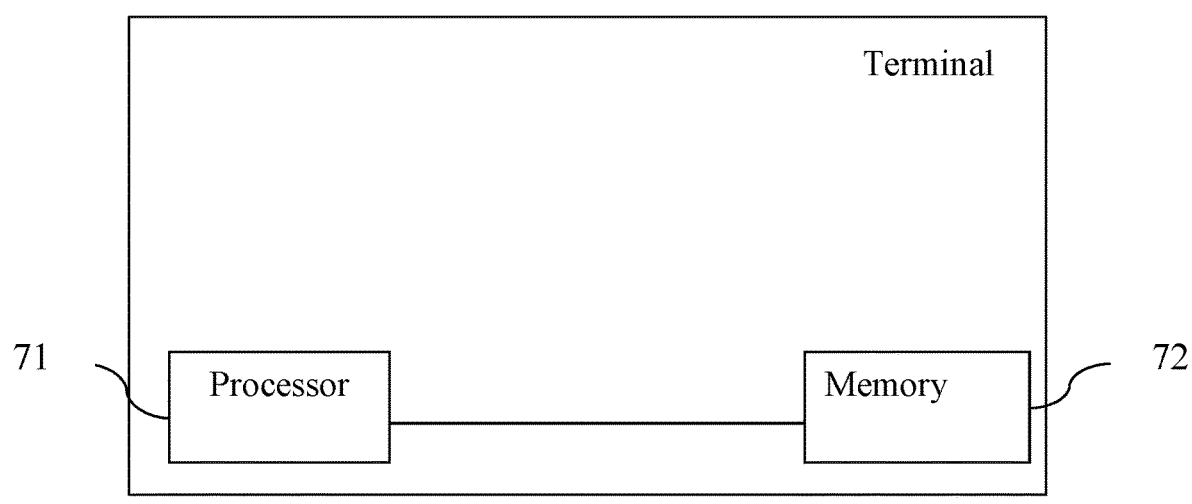
FIG. 7 is a schematic diagram of a terminal according to an embodiment of the present disclosure.

As shown in FIG. 7 of one embodiment, the terminal of the present disclosure includes a processor 71 and a memory 72.

The memory 72 is configured to store computer programs.

The memory 72 includes ROMs, RAMs, magnetic disks, U-disks, memory cards, or compact discs and the like.

The processor 71 is connected with the memory 72 and executes a computer program stored in the memory 72, so that the terminal executes the data reading/writing method in 3D image processing.

Preferably, the processor 71 may be a general-purpose processor, including a central processing unit (CPU), network processor (NP), etc. The processor 71 can also be a digital signal processor (DSP), Application Specific Integrated Circuit (ASIC), Field-Programmable Gate Array (FPGA) or other programmable logic devices, discrete gate or transistor logic devices, discrete hardware components.

In summary, the data reading/writing method and system in 3D image processing, storage medium and terminal of the present disclosure are based on 3D vertical sliding technology and circular buffers, which can reduce the processing of overlapping parts and greatly improve 3D graphics with limited buffer utilization rate during the image processing. By analyzing the entire network, the results between layers no longer necessarily interact with DDR to reduce access to DDR with the limited buffer, so as to reduce the bandwidth requirements of image processing algorithms, and reduce reading/writing latency and power consumption; smaller buffer area can be used in hardware design. Therefore, the present disclosure effectively overcomes various shortcomings in the prior arts and has high industrial utilization potentials.

The above-mentioned embodiments merely illustrate the principle of the present disclosure and its effects, which are not intended to limit the present disclosure. Those skilled in the art can modify or change the above embodiments without departing from the spirit and scope of the present disclosure. Therefore, all the equivalent modifications or changes made by a person having ordinary knowledge in the technical field without departing from the spirit and technical ideas disclosed by the present disclosure should still be covered by the claims of the present disclosure.

The invention claimed is:

1. A data reading/writing method in 3D made processing, comprising the following steps:
    dividing a 3D image horizontally based on the vertical sliding technology, wherein the 3D image is divided into at least two subimages, a processing data of each subimage is stored in a circular buffer, after the subimage is processed, an overlapping portion data required by next subimage is retained in the circular buffer; and
    dividing a multi-layer network of an image processing algorithm into at least two segments, the data between adjacent layers in each segment only interact through buffer, not through DDR,
    wherein the size of the circular buffer occupied by each subimage is SubimageXsize·(SubimageYsize+OverlapSize)·SubimageZSize, wherein the SubimageXsize, SubimageYsize, SubimageZSize, and OverlapSize are respectively a size in X direction, Y direction, Z direction, and an overlapping size.

2. The data reading/writing method in 3D image processing according to claim 1, wherein in each segment, the output data of each layer is written into the buffer except the last layer, each layer except the first layer reads data from the buffer.

3. The data reading/writing method in 3D image processing according to claim 1, wherein the method is applied to 3D image processing of a neural network.

4. A non-transitory storage medium, containing a computer program, wherein when executed by a processor, the computer program causes the processor to perform a data reading/writing method in 3D image processing according to claim 1.

5. A terminal, comprising; a processor and a memory, wherein
    the memory stores a computer program;
    the processor executes the computer program stored in the memory, the terminal executes a data reading/writing method 3D image processing according of claim 1.

* * * * *